United States Patent
Kobayashi et al.

(10) Patent No.: US 8,274,984 B2
(45) Date of Patent: Sep. 25, 2012

(54) RADIO NETWORK CONTROLLER

(75) Inventors: Kazunari Kobayashi, Kawasaki (JP); Tomonori Kumagai, Kawasaki (JP); Tetsuo Tomita, Kawasaki (JP); Eiji Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 841 days.

(21) Appl. No.: 11/022,522

(22) Filed: Dec. 23, 2004

(65) Prior Publication Data
US 2005/0105482 A1   May 19, 2005

Related U.S. Application Data

(63) Continuation of application No. PCT/JP02/09127, filed on Sep. 6, 2002.

(51) Int. Cl.
*H04L 12/28* (2006.01)
*H04L 12/56* (2006.01)
*H04J 4/00* (2006.01)
*H04W 36/30* (2009.01)

(52) U.S. Cl. ............. 370/395.5; 370/252; 370/349; 370/392; 370/395.41; 370/432; 370/352; 370/356; 370/394; 370/395.21; 370/203; 370/437; 370/468; 370/228; 370/338; 370/470; 455/67.11; 455/436; 455/450; 455/522; 709/223; 709/224

(58) Field of Classification Search .......... 370/228–463, 370/474; 455/331–522
See application file for complete search history.

(56) References Cited

U.S. PATENT DOCUMENTS

| 5,226,045 | A | * | 7/1993 | Chuang | 370/332 |
| 5,361,402 | A | * | 11/1994 | Grube et al. | 455/67.11 |
| 5,363,375 | A | * | 11/1994 | Chuang et al. | 370/332 |
| 5,535,429 | A | | 7/1996 | Bergenlid et al. | |
| 5,570,367 | A | * | 10/1996 | Ayanoglu et al. | 370/346 |
| 5,644,576 | A | * | 7/1997 | Bauchot et al. | 370/437 |
| 5,963,557 | A | * | 10/1999 | Eng | 370/432 |
| 6,088,431 | A | * | 7/2000 | LaDue | 379/114.2 |
| 6,272,123 | B1 | * | 8/2001 | Abe | 370/342 |
| 6,307,867 | B1 | * | 10/2001 | Roobol et al. | 370/470 |

(Continued)

FOREIGN PATENT DOCUMENTS

CN     1095544 A     11/1994

(Continued)

OTHER PUBLICATIONS

International Search Report dated Oct. 22, 2002.

(Continued)

*Primary Examiner* — Ayaz R. Sheikh
*Assistant Examiner* — Venkatesh Haliyur
(74) *Attorney, Agent, or Firm* — Katten Muchin Rosenman LLP (57) ABSTRACT

A communications system having an ATM transmission line and an IP transmission line is disclosed that includes a base station capable of communicating with a mobile terminal through a radio link; and a radio network controller capable of communicating with the base station through the ATM or IP transmission line. The radio network controller includes a division part dividing transmission data into signals of a predetermined data size; a transmission part transmitting the divided signals to the base station at predetermined time intervals; a retransmission part retransmitting the signals transmitted to the base station when a response signal from the mobile terminal is not received within a predetermined period; a measuring part measuring a signal response period in a communications channel between the radio network controller and the mobile terminal through the base station; and a determination part determining the predetermined data size based on the measured response period.

10 Claims, 11 Drawing Sheets

U.S. PATENT DOCUMENTS

| | | | |
|---|---|---|---|
| 6,327,255 B1* | 12/2001 | Kage | 370/335 |
| 6,347,226 B1* | 2/2002 | Virtanen | 455/450 |
| 6,363,411 B1* | 3/2002 | Dugan et al. | 709/202 |
| 6,473,399 B1* | 10/2002 | Johansson et al. | 370/229 |
| 6,496,477 B1* | 12/2002 | Perkins et al. | 370/228 |
| 6,529,731 B2* | 3/2003 | Modzelesky et al. | 455/427 |
| 6,567,388 B1* | 5/2003 | Tomcik et al. | 370/335 |
| 6,574,213 B1* | 6/2003 | Anandakumar et al. | 370/349 |
| 6,574,453 B1* | 6/2003 | Honda et al. | 455/11.1 |
| 6,611,495 B1 | 8/2003 | Meyer et al. | |
| 6,643,318 B1* | 11/2003 | Parsa et al. | 375/141 |
| 6,678,267 B1* | 1/2004 | Anandakumar et al. | 370/356 |
| 6,681,099 B1* | 1/2004 | Keranen et al. | 455/67.16 |
| 6,690,655 B1* | 2/2004 | Miner et al. | 370/278 |
| 6,697,331 B1* | 2/2004 | Riihinen et al. | 370/236 |
| 6,700,902 B1* | 3/2004 | Meyer | 370/468 |
| 6,728,208 B1* | 4/2004 | Puuskari | 370/230.1 |
| 6,744,757 B1* | 6/2004 | Anandakumar et al. | 370/352 |
| 6,757,245 B1* | 6/2004 | Kuusinen et al. | 370/230 |
| 6,757,256 B1* | 6/2004 | Anandakumar et al. | 370/252 |
| 6,765,904 B1* | 7/2004 | Anandakumar et al. | 370/389 |
| 6,779,030 B1* | 8/2004 | Dugan et al. | 709/223 |
| 6,801,499 B1* | 10/2004 | Anandakumar et al. | 370/229 |
| 6,801,532 B1* | 10/2004 | Anandakumar et al. | 370/394 |
| 6,804,244 B1* | 10/2004 | Anandakumar et al. | 370/395.21 |
| 6,831,908 B2* | 12/2004 | Kikuchi | 370/338 |
| 6,870,808 B1* | 3/2005 | Liu et al. | 370/203 |
| 6,973,489 B1* | 12/2005 | Levy | 709/224 |
| 6,993,292 B2* | 1/2006 | Sabongi et al. | 455/67.11 |
| 7,023,825 B1* | 4/2006 | Haumont et al. | 370/338 |
| 7,065,359 B2* | 6/2006 | Chuah et al. | 455/436 |
| 7,088,678 B1* | 8/2006 | Freed et al. | 370/230 |
| 7,116,683 B1* | 10/2006 | Petersen et al. | 370/474 |
| 7,159,163 B2* | 1/2007 | Lundby | 714/749 |
| 7,167,713 B2* | 1/2007 | Anderson | 455/456.1 |
| 7,209,964 B2* | 4/2007 | Dugan et al. | 709/223 |
| 7,254,401 B2* | 8/2007 | Keranen et al. | 455/456.1 |
| 7,286,846 B2* | 10/2007 | Chen et al. | 455/522 |
| 7,315,903 B1* | 1/2008 | Bowden | 709/250 |
| 7,464,395 B2* | 12/2008 | Jiang et al. | 725/93 |
| 7,487,508 B2* | 2/2009 | Fu et al. | 719/310 |
| 7,496,374 B2* | 2/2009 | Malkamaki | 455/522 |
| 7,626,989 B2* | 12/2009 | Raitola et al. | 370/395.41 |
| 7,630,986 B1* | 12/2009 | Herz et al. | 1/1 |
| 7,937,470 B2* | 5/2011 | Curley et al. | 709/226 |
| 2001/0012775 A1* | 8/2001 | Modzelesky et al. | 455/427 |
| 2001/0015956 A1 | 8/2001 | Ono | |
| 2001/0017850 A1* | 8/2001 | Kalliokulju et al. | 370/331 |
| 2002/0032030 A1* | 3/2002 | Berglund et al. | 455/434 |
| 2002/0080774 A1 | 6/2002 | Griffith et al. | |
| 2002/0120727 A1* | 8/2002 | Curley et al. | 709/223 |
| 2002/0191540 A1 | 12/2002 | Fuji | |
| 2003/0009385 A1* | 1/2003 | Tucciarone et al. | 705/26 |
| 2003/0056228 A1* | 3/2003 | Foster et al. | 725/133 |
| 2003/0149578 A1* | 8/2003 | Wong | 705/1 |
| 2003/0156548 A1* | 8/2003 | Sapp | 370/252 |
| 2003/0217162 A1* | 11/2003 | Fu et al. | 709/229 |
| 2004/0122730 A1* | 6/2004 | Tucciarone et al. | 705/14 |
| 2004/0148546 A1* | 7/2004 | Meyer et al. | 714/18 |
| 2005/0021713 A1* | 1/2005 | Dugan et al. | 709/223 |
| 2006/0290519 A1* | 12/2006 | Boate et al. | 340/573.4 |

FOREIGN PATENT DOCUMENTS

| | | |
|---|---|---|
| JP | 63-92140 | 4/1988 |
| JP | 2-67848 | 3/1990 |
| JP | 04-17456 | 1/1992 |
| JP | 07-079250 | 3/1995 |
| JP | 09-186739 | 7/1997 |
| JP | 10-308752 | 11/1998 |
| JP | 2001-160824 | 6/2001 |
| JP | 2002-135330 | 5/2002 |
| WO | 0051296 | 8/2000 |
| WO | 0245351 | 6/2002 |

OTHER PUBLICATIONS

Japanese Office Action mailed Jul. 4, 2006, with translation.
Chinese Office Action issued on Apr. 6, 2007, from the corresponding Chinese Office Action, with translation.
Supplementary European Search Report and Annex to the European Search Report dated Nov. 21, 2007 for corresponding European Application EP 02 77 2839.
Japanese Office Action dated Jun. 3, 2008, from the corresponding Japanese Application.

* cited by examiner

| CONNECTION IDENTIFIER | BASE STATION IDENTIFIER | SET RATE (kbps) | DESIRED RATE (kbps) | MAXIMUM RATE (kbps) | RESPONSE PERIOD (ms) | TFS | TRANSMISSION BAND (kHz) |
|---|---|---|---|---|---|---|---|
| C0 | BTS0 | 384 | 384 | 500 | 400 | 2 | 400 |
| C1 | BTS1 | 32 | 64 | 32 | 900 | 1 | 40 |
| C2 | BTS2 | 64 | 384 | 64 | 800 | 2 | 100 |
| ... | ... | ... | ... | ... | ... | ... | ... |

RADIO NETWORK CONTROLLER

CROSS REFERENCE TO RELATED APPLICATION

This application is a U.S. continuation application filed under 35 U.S.C. 111(a) claiming benefit under 35 U.S.C. 120 and 365(c) of PCT International Application No. PCT/JP02/09127, filed Sep. 6, 2002, the contents of which are hereby incorporated by reference.

BACKGROUND OF THE INVENTION

1. Field of the Invention

The present invention relates to a radio network controller.

2. Description of the Related Art

In recent years, rapid progress has been made in the research and development of CDMA (Code Division Multiple Access) communications systems, so that not only audio and still images but also a broadband CDMA system (W-CDMA: Wideband CDMA) has emerged. 3GPP (3rd Generation Partnership Project [http://www.3gpp.org/]), which is a standardization group for a 3rd Generation Mobile System, aims to realize a system that can provide high-quality services, developing various W-CDMA communications system standards.

Figure 1:
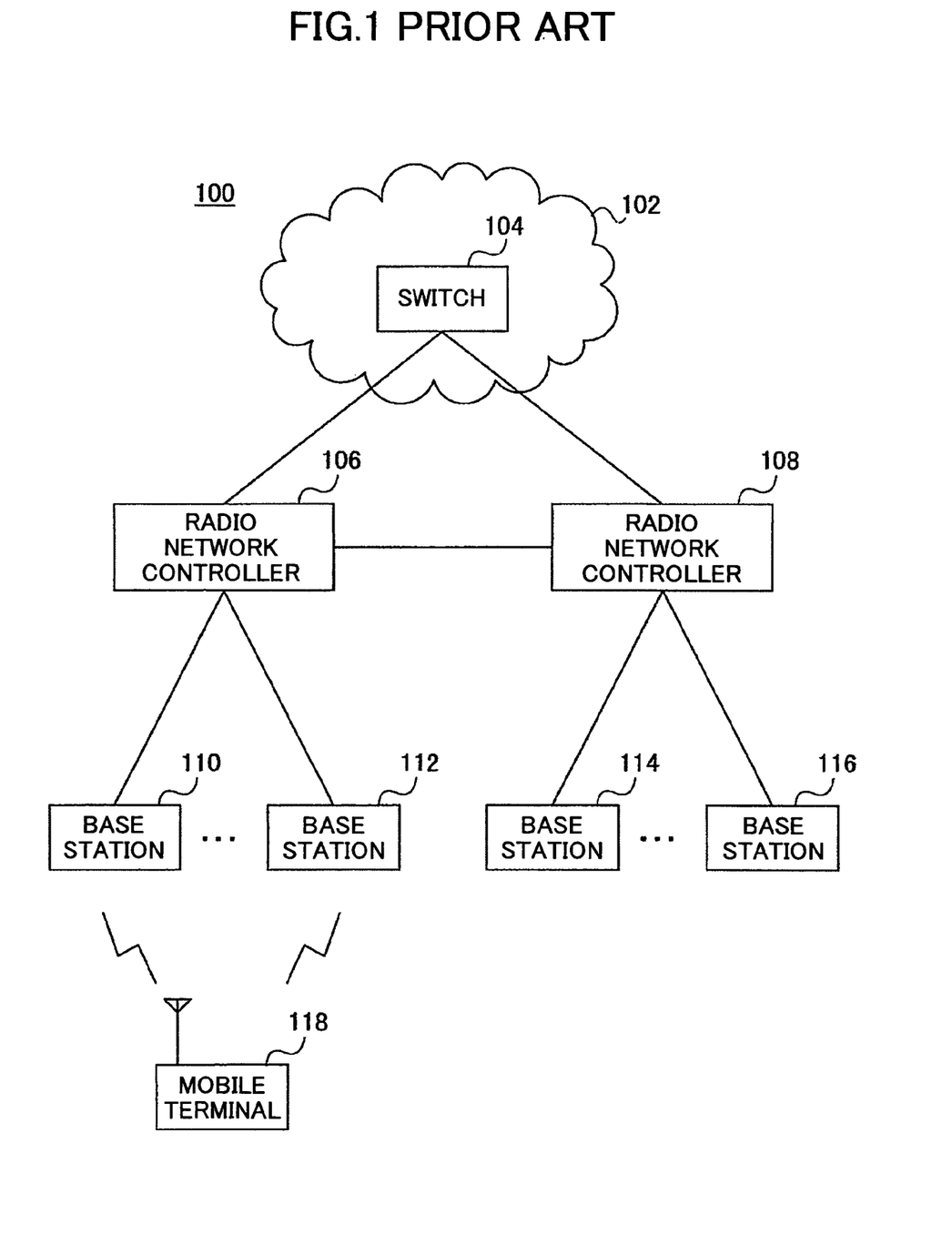
FIG. 1 is a schematic diagram of a conventional 3GPP communications system.

FIG. 1 is a schematic diagram of a conventional 3GPP communications system 100. A core network 102, which is connected to any network, includes a switch 104 between this system and another system. This switch 104 is connected to radio network controllers 106 and 108, which are connected to multiple base stations 110 and 112 and multiple base stations 114 and 116, respectively. These base stations can communicate with a mobile terminal 118 through a radio link in the W-CDMA. The nodes of the switch 104, the radio network controllers 106 and 108, and the base stations 110 through 116 are connected with ATM transmission lines that enable asynchronous transfer mode (ATM) communications.

Figure 2:
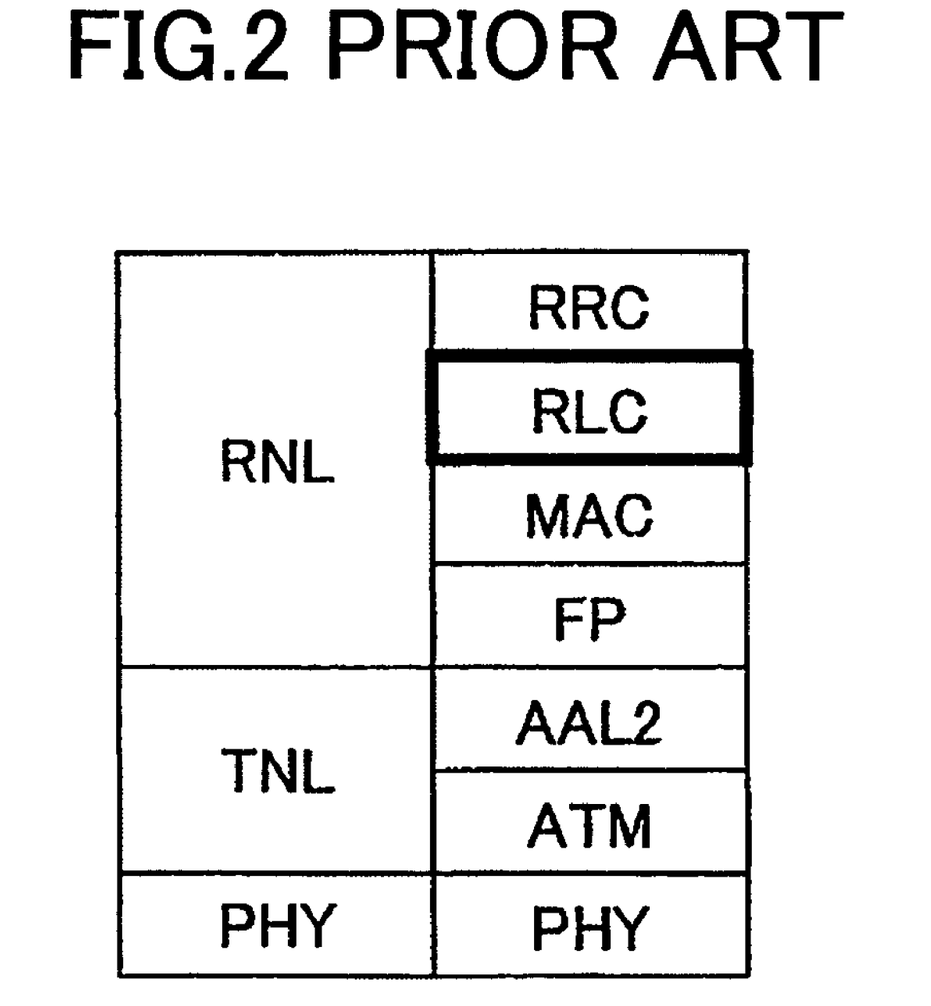
FIG. 2 is a diagram showing a main protocol stack employed in the 3GPP communications system.

FIG. 2 shows a main protocol stack employed in such a 3GPP communications system. In the drawing, the left column indicates layers, and the right column indicates protocols. The graphically illustrated layers are, in order from the lowest, the Physical Layer (PHY), the Transport Network Layer (TNL), and the Radio Network Layer (RNL). In the Transport Network Layer (TNL), ATM and AAL2 (ATM Adaptation Layer 2) are employed. In the Radio Network Layer (RNL), a frame protocol (FP), Medium Access Control (MAC), Radio Link Control (RLC), and Radio Resource Control (RRC) are employed. The 3GPP communications system has a data retransmission function for ensuring data, which is realized by the RLC of the Radio Network Layer (RNL) in particular. The part from ATM to RLC corresponds to the Layer 2 (Data Link Layer) that ensures data in the OSI model.

The radio network controllers 106 and 108 (the transmission side) transmit a signal to the mobile terminal 118. The mobile terminal 118, receiving a predetermined signal (data in which a polling bit is set), returns a response message for acknowledgement. The mobile terminal returns an ACK (Acknowledgement) response when receiving the signal (data) normally, and when not, returns an NACK (Non-Acknowledgement) response. The transmission side transmits the next signal when receiving the ACK response, and retransmits the data that has not been received normally by the mobile terminal when receiving the NACK signal. In principle, the transmission side is on standby without transmitting the next signal until the ACK or NACK response is returned. However, if the transmission side is always to wait until receiving the response message, the transmission side ends up waiting continuously when the data of the transmission side disappears in a transmission line before reaching the mobile terminal or the response from the mobile terminal disappears. Accordingly, the transmission side includes a timer function. If the response message is not received before a predetermined period (a timeout period) expires, the transmission side considers that transmitted data is not received normally, and retransmits the transmitted data. In the 3GPP communications system, internode communications are performed through ATM transmission lines that are dedicated lines enabling extremely high-speed communications. Accordingly, the response period and the delay period of the mobile terminal per communications line (connection or call) are substantially constant. Therefore, the predetermined period is set to a constant value characteristic of the system.

By the way, if it is possible to realize a communication system into which the conventional 3GPP communications system and a communication system using the Internet are combined, it is expected that connection fees could be controlled, and that providable services would improve greatly in both quality and amount.

Figure 3:
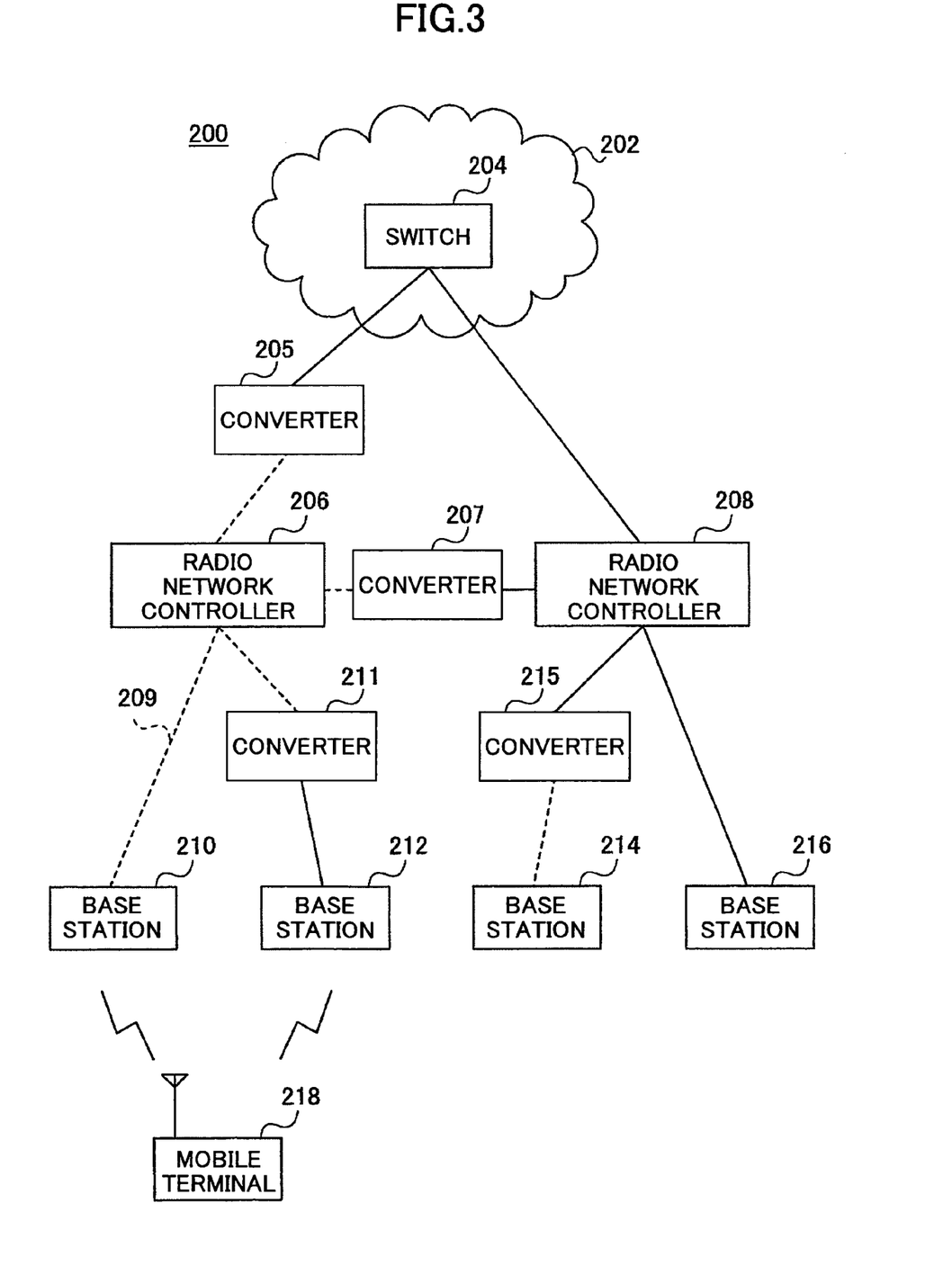
FIG. 3 is a schematic diagram of a communications system having ATM and IP transmission lines.

FIG. 3 is a schematic diagram of such a next generation communications system 200. A core network 202 includes a switch 204 between this system and another system. This switch 204 is connected to radio network controllers 206 and 208, which are connected to multiple base stations 210 and 212 and multiple base stations 214 and 216, respectively. These base stations can communicate with a mobile terminal 218 through a radio link in the W-CDMA. The system is thus far the same as that shown in FIG. 1. However, in the communications system shown in FIG. 3, while the switch 204, the radio network controller 208, and the base stations 212 and 216 are ATM nodes that perform ATM communications, the radio network controller 206 and the base stations 210 and 214 are IP nodes that operate based on the Internet Protocol (IP). Of the graphically illustrated transmission lines, the ATM transmission lines are indicated by solid lines, and the IP transmission lines are indicated by broken lines. Converters 205, 207, 211, and 215 for protocol conversion are provided between the ATM nodes and IP nodes that communicate with each other. The Internet Protocol (IP) can be related to the ATM and AAL2 parts of the Transport Network Layer (TNL) in the protocol stack of FIG. 2.

As described above, since the ATM transmission lines are extremely high-speed dedicated transmission lines, the difference in response period between connections is negligible. However, the IP transmission lines are a public network different from dedicated lines. Accordingly, the difference in response period between connections may vary extremely greatly. The network topology of IP transmission lines is not strictly fixed, and communications channel length and devices to go through differ between connections. Further, these are difficult to predict. When the radio network controller 206 and the base station 210 communicate, an IP transmission line 209 is used. However, an increase in the number of nodes to go through causes an increase in transmission delay. Further, when the IP node network controller 206 and the ATM node base station 212 communicate, it is necessary to perform protocol conversion in the converter 211 in the middle of the communications channel. This conversion may cause an increase in transmission delay. These transmission delays due to IP transmission lines are not constant, and may vary constantly depending on the communications environment.

When a signal retransmission procedure as performed in the communications system of FIG. 1 is performed in this communications system 200, some connections (communications channels) may require a response period (a period of time required to go back and forth between the radio network controller and the mobile terminal) longer than a fixed predetermined period (timeout period). In this case, even if the data of the transmission side is normally received, the response message is not returned before the predetermined period expires. Accordingly, retransmission is performed. The retransmission of the normally received signal is an unnecessary retransmission of a signal, so that there is a risk of degradation of transmission efficiency.

To the contrary, other connections may only require a response period much shorter than the predetermined period. In this case also, retransmission should be held up until the timeout period expires. This results in a long period of data transmission although high-speed communications with a short response period are performable. In this case, transmission efficiency is also degraded. Accordingly, it is desired that the timeout period for retransmission be slightly longer than the response period, and a timeout period longer or shorter than this may degrade transmission efficiency.

From this viewpoint, it may be considered to understand all communications channels and set an appropriate timeout period for each communications channel so as to use a different timeout period for each connection. However, as described above, the network topology in IP transmission lines is not strictly fixed. Accordingly, understanding all the communications channels and managing multiple timeout periods appropriately result in a complicated system and higher apparatus prices, thus not being a practical solution.

SUMMARY OF THE INVENTION

Accordingly, it is a general object of the present invention to provide a radio network controller in which the above-described disadvantages are eliminated.

A more specific object of the present invention is to provide a radio network controller that can improve data transmission efficiency in a communications system using ATM transmission lines and IP transmission lines.

The above objects of the present invention are achieved by a communications system having an asynchronous transfer mode (ATM) transmission line enabling ATM communications and an IP transmission line enabling communications compliant with the Internet Protocol (IP), the communications system including a base station capable of communicating with a mobile terminal through a radio link; and a radio network controller capable of communicating with the base station through the ATM transmission line or the IP transmission line, wherein the radio network controller includes a division part configured to divide transmission data into signals of a predetermined data size; a transmission part configured to transmit the divided signals to the base station at predetermined time intervals; a retransmission part configured to retransmit the signals transmitted to the base station when a response signal from the mobile terminal is not received within a predetermined period; a measuring part configured to measure a signal response period in a communications channel between the radio network controller and the mobile terminal through the base station; and a determination part configured to determine the predetermined data size based on the measured response period.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 4:
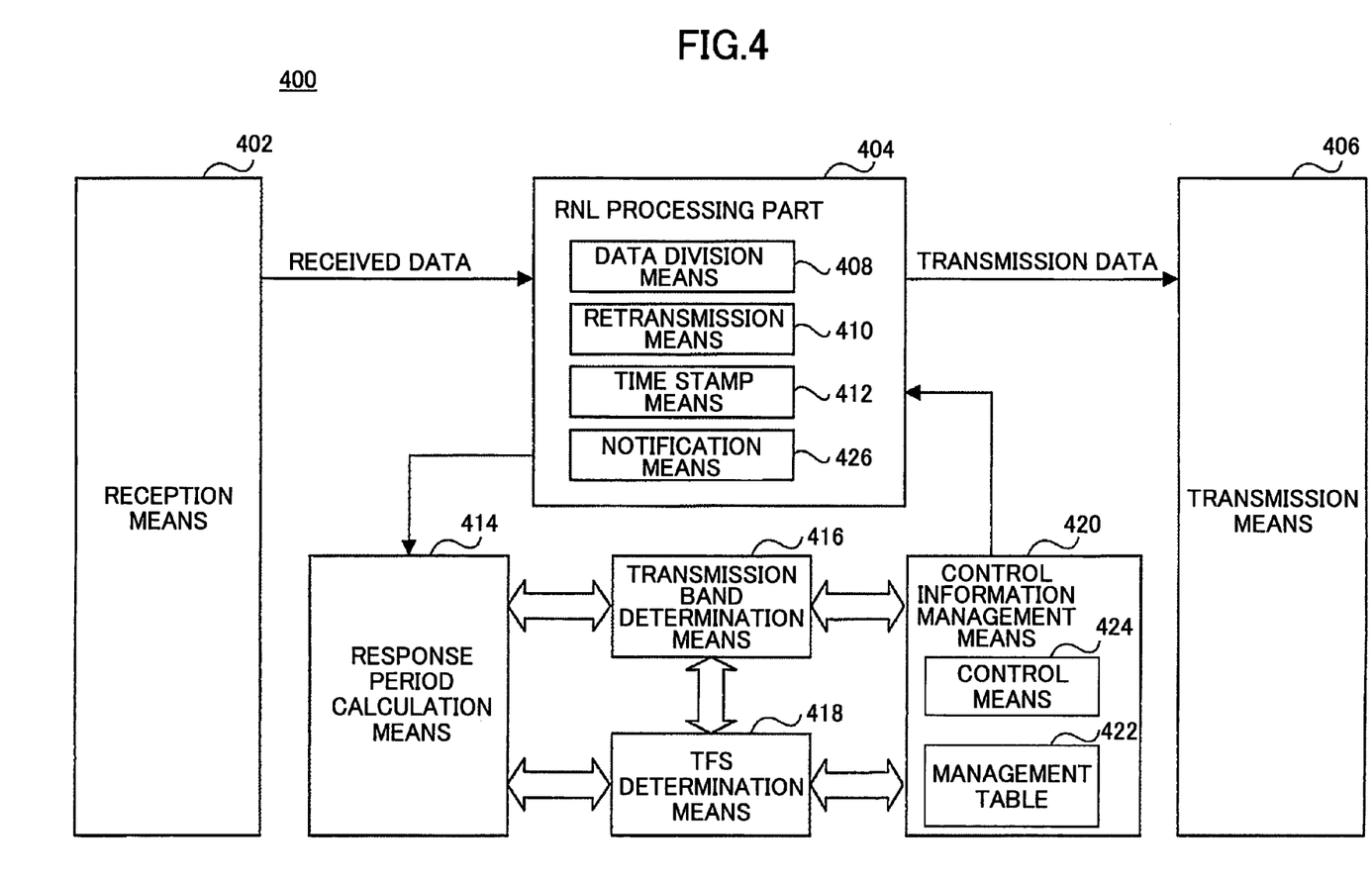
FIG. 4 is a functional block diagram of a radio network controller employed in a communications system according to an embodiment of the present invention.

FIG. 4 is a functional block diagram of a radio network controller 400 employed in a communications system according to an embodiment of the present invention. The radio network controller 400 is commonly used mainly for the radio network controllers 206 and 208 shown in FIG. 3.

The radio network controller 400 includes reception means 402 for receiving a signal from the switch 204 (FIG. 3) or a subordinate base station, an RNL processing part 404 converting the data received from the switch 204 into transmission data to be transmitted to the subordinate base station, and transmission means 406 for transmitting the transmission data to the base station. The data received from the reception means 402 is divided into signals of a predetermined data size such as 40 octets by data division means 408 of the RNL processing part 404, and the transmission data is formed by the divided signals. Further, the RNL processing part 404 includes retransmission means 410 for retransmitting transmitted data when the reception means 402 receives the NACK response from the base station. Further, the retransmission means 410 determines whether a predetermined period (a timeout period) has elapsed since the transmission of data from the radio network controller using a timer (not graphically illustrated), and retransmits the transmitted data if the predetermined period has elapsed. If the ACK or NACK response is received before the predetermined period elapses, the timer is reset, and is restarted at the time of the next data transmission. The RNL processing part 404 includes time stamp means 412 for performing processing for measuring the response period of a communication channel through which communications with the mobile terminal are being performed. The time stamp means 412 mainly determines the transmission time of a time stamp request message (transmitted from the transmission means 406) serving as the starting point of the response period and the reception time of a time stamp response message (received by the reception means 402) serving as the end point of the response period.

The radio network controller 400 includes response period calculation means 414 for receiving the determined values for calculating the response period from the RNL processing means 404 and calculating the response period. In addition to the calculation of the response period, the response period calculation means 414 determines the length of the response period, and determines the necessity of changing a TFS or a transmission band. A TFS (Transport Format Set) refers to the amount of data transmitted simultaneously (for instance, in a single frame) from the radio network controller to the base station.

The radio network controller 400 includes transmission band determination means 416 for determining the transmission band of a radio link based on the response period obtained in the response period calculation means 414 and TFS determination means 418 for determining the TFS (a predetermined data size) based on the response period. The transmission band determination means 416 calculates a maximum (transmission) rate possible for transmission in the connection using the calculated response period. Further, the transmission band determination means 416 can calculate an appropriate transmission band for a given transmission rate. The TFS determination means 418 determines an appropriate TFS value for the connection using the response period and the maximum rate.

The radio network controller 400 includes control information management means 420 for providing the transmission band determination means 416 and the TFS determination means 418 with necessary control information and managing it. The control information management means 420 includes a management table 422 of TFS-related and transmission band-related information and control means 424 accessing the contents of the management table 422 to perform reading and updating. When the TFS or the transmission band is updated, the RNL processing part 404 can be notified of this updating. Notification means 426 in the RNL processing part 404 receiving this notification transmits transmission data for notification to other nodes.

Figure 5:
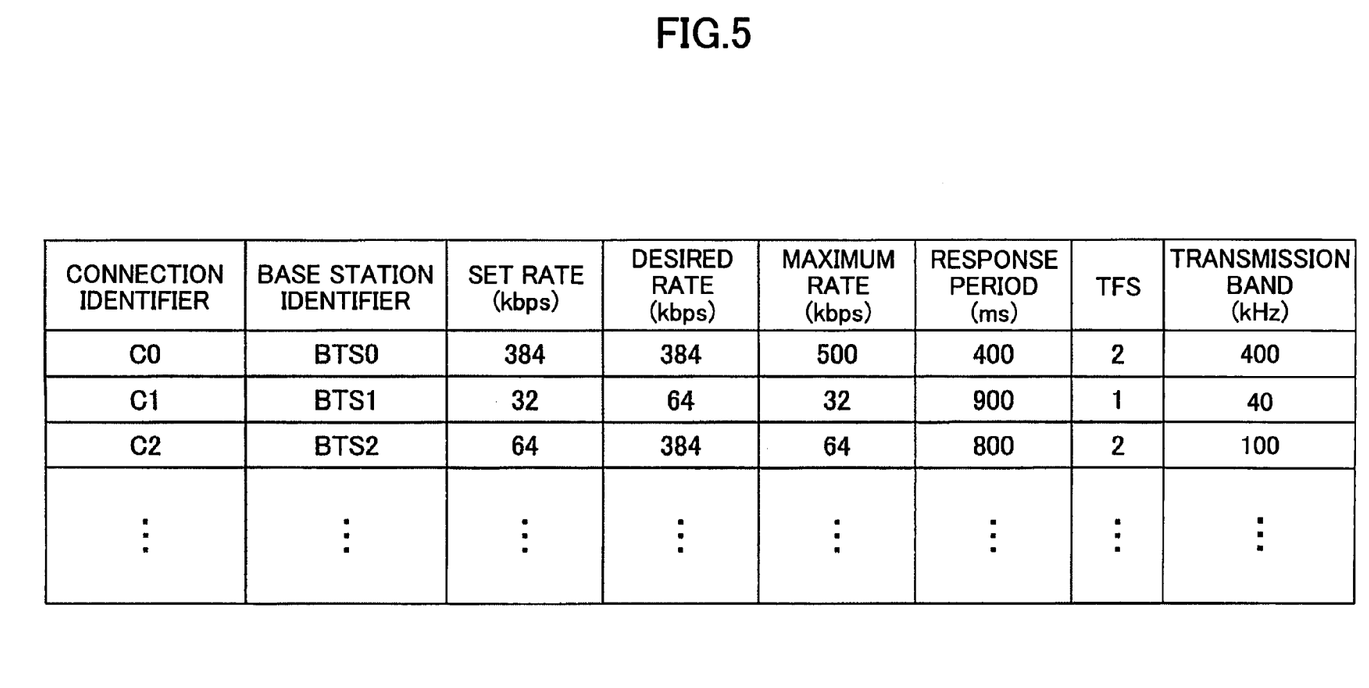
FIG. 5 is a table showing the specific contents of a management table.

FIG. 5 shows an example of the management table 422. The leftmost column of the management table shows the identifier of each connection, showing the identifier of a path established by a user for communications. The second column from the left shows the identifier of a base station to which the connection is related. Each base station is assigned one at the time of the activation of the communications system. The third column SET RATE shows a transmission rate that is actually set at the time. The fourth column DESIRED RATE shows a transmission rate that is requested by the mobile terminal at the time of setting the connection. The set rate is set to a desired rate at the time of setting the connection. However, the set rate may vary because of a change in the transmission band due to the present invention. The fifth column MAXIMUM RATE shows a currently realizable maximum transmission rate in the connection. The actual transmission rate decreases when the response period increases, and increases when the response period decreases. Accordingly, when the response period varies, the maximum rate also varies. Therefore, the maximum rate column is updated for each variation. The sixth column shows the response period required for a signal to go back and forth between the radio network controller and the mobile terminal. The response period is measured by transmitting the time stamp request message and receiving the time stamp response message. In the case of going through an IP transmission line, the response period may vary greatly. Accordingly, the response period is also updated as required. The seventh column shows a currently set TFS. The eighth column shows a currently set transmission band value. Like the maximum rate, the TFS and the transmission band are also updated in accordance with a change in the response period.

Figure 6:
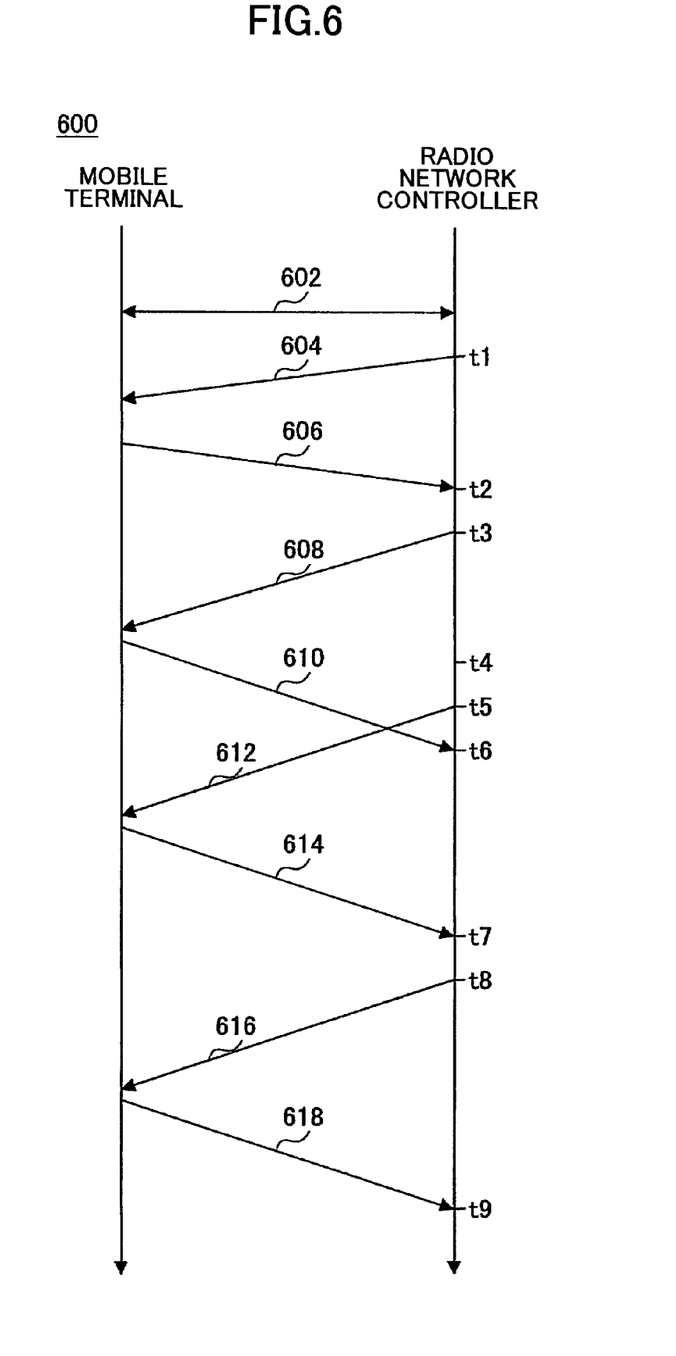
FIG. 6 is a timing chart showing an operation between the radio network controller and a mobile terminal in the communications system according to the embodiment of the present invention.

FIG. 6 is a timing chart 600 showing an operation between the radio network controller and the mobile terminal in the communications system according to the embodiment of the present invention. Actually, communications are performed via a base station. In this drawing, however, the base station is omitted for simplification. First, the mobile terminal makes a request to set a connection for performing communications, and processing in response to this request is performed (602). This processing includes the initialization of the management table 422 (FIG. 5) according to the present invention in addition to existing processing such as the allocation of communication resources. The exchange of signals between the mobile terminal and the radio network controller in the initialization requires some time, but is indicated by reference numeral 602 for simplification.

As a result of this processing in 602, the identification number (BTS0) of the related base station and the identification number (C0) of the related connection are entered, and the set rate is set to the desired rate of the mobile terminal (for instance, 384 kbps) as shown in the second row of the table of FIG. 5. Next, the radio network controller transmits a time stamp request message to the mobile terminal using the time stamp means 412 (FIG. 4). Receiving this, the mobile terminal transmits a time stamp response message, and its reception time is determined in the radio network controller. A response period (for instance, 400 ms) is calculated in the response period calculation means 414 based on these determined values, and is stored in the sixth column (FIG. 5) of the management table 422. Based on this response period, a transmission band (for instance, 400 k) and a TFS (for instance, 2) are determined in the transmission band determination means 416 and the TFS determination means 418, respectively. Further, a maximum rate (for instance, 500 kbps) is determined based on these numeric values and, as required, information from another table (not graphically illustrated).

Figure 7:
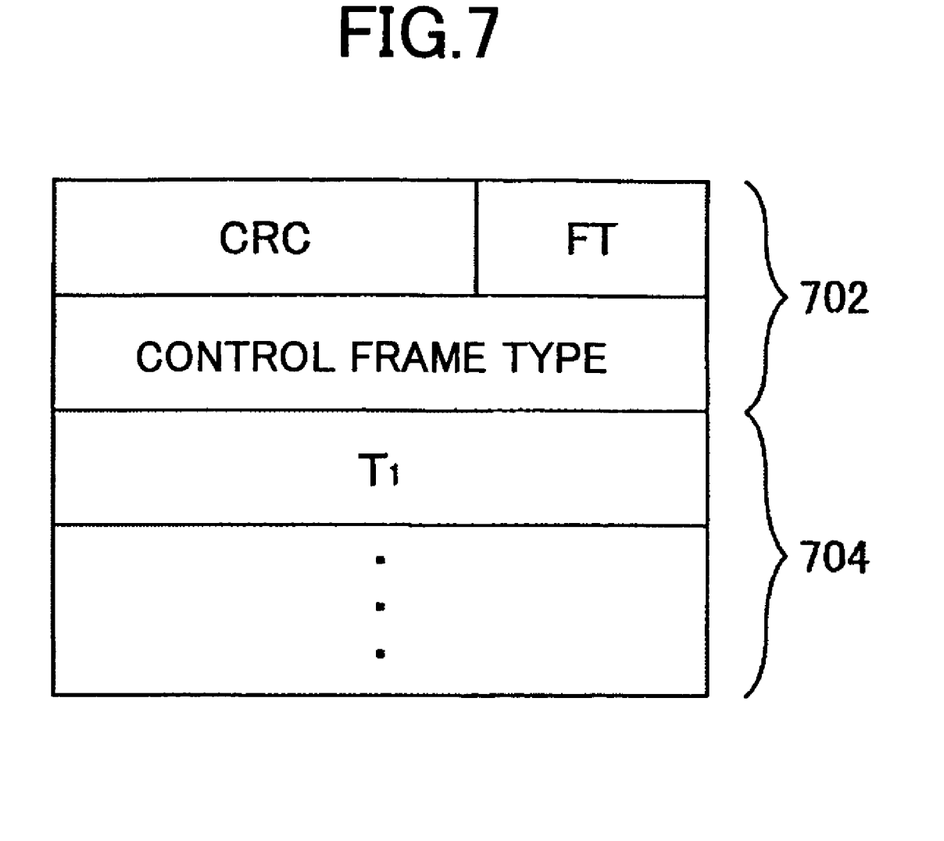
FIG. 7 is a diagram showing a signal format of a time stamp request message.

FIG. 7 shows a signal format of the time stamp request message transmitted from the radio network controller.

This message includes, for instance, a header 702 of 2 bytes and a payload 704. The header 702 includes information necessary to transmit the payload 704 containing information to be transmitted. Specifically, the header 702 includes CRC (Cyclic Redundancy Check) for error checking, an FT bit distinguishing between user data and control data, and a control frame type. The payload 704 includes a transmitter time stamp T1 that is information on a transmission time.

Figure 8:
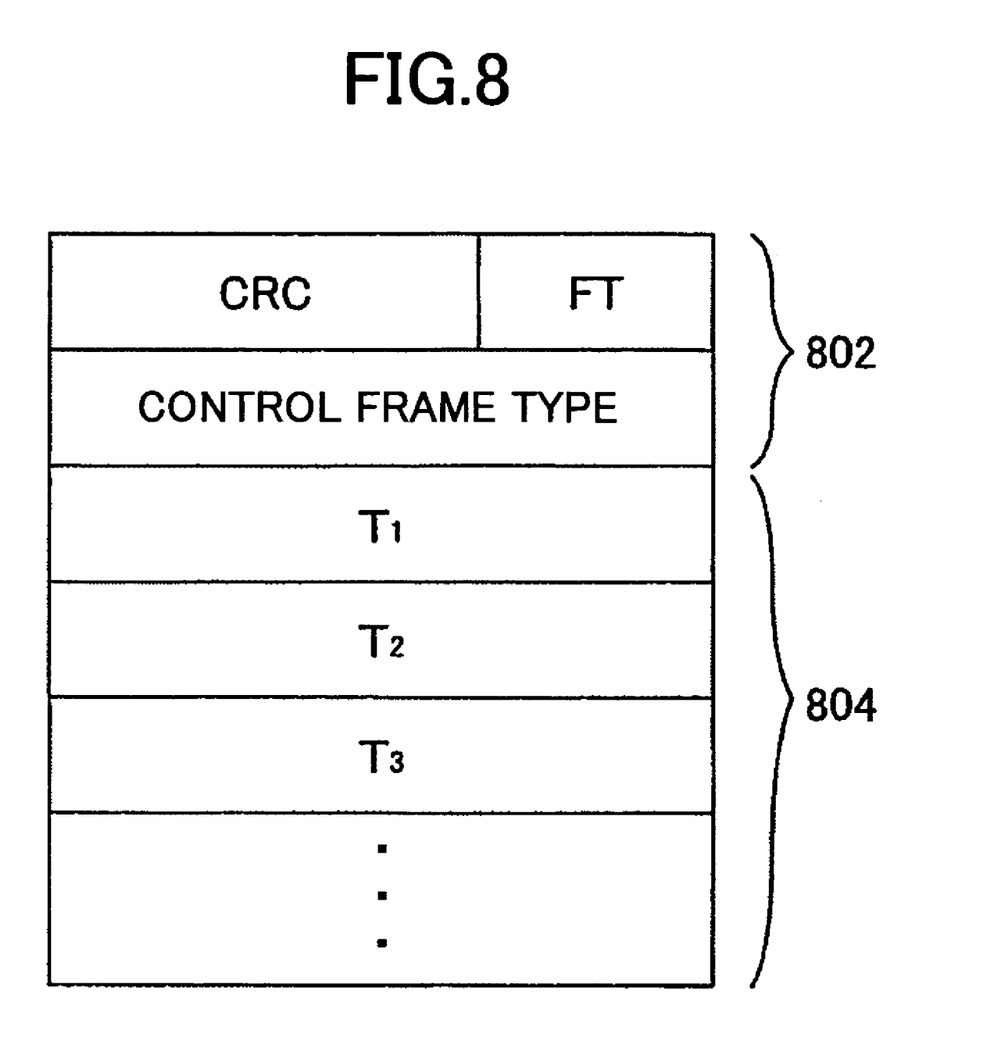
FIG. 8 is a diagram showing a signal format of a time stamp response message.

FIG. 8 is a signal format of the time stamp response message transmitted from the mobile terminal in response to the time stamp request message. Like the time stamp request message, this message also includes a header 802 and a payload 804, and the header 802 includes CRC, FT, and a control frame type. The payload 804 includes, in addition to the transmitter time stamp T1, a reception time stamp T2 of the responding side (the mobile terminal side) and a transmitter time stamp T3 of the responding side. The radio network controller measures the response period of the channel using a time T4 at which this time stamp response message is received and the transmitter time stamp T1 included in this message. The time stamps T2 and T3 of the responding side may be substituted for or used in addition to them in order to calculate the response period. For instance, in the case of a relatively long response period, not only an increased delay in the communications channel between the radio network controller and the mobile terminal but also an increased processing period between reception and transmission in the mobile terminal may be considered as the case. Use of the time stamps T2 and T3 of the responding side makes it possible to understand such a situation.

When the connection is established and the initialization of the update table is completed, the mobile terminal starts to communicate. At Time t1, the radio network controller transmits received data to the mobile terminal (604). The internal timer of the retransmission means 410 starts at this transmission time. Receiving the signal from the network controller, the mobile terminal returns an ACK or NACK response signal in response to the signal (606). This return signal arrives at the radio network controller at Time t2, when the timer stops and is reset.

Next, it is assumed that a signal transmitted from the radio network controller at Time t3 arrives at the mobile terminal with a relatively great delay because of inclusion of an IP transmission line in the communications channel (608). The timer has restarted timekeeping at Time t3. A response signal from the mobile terminal also arrives at the radio network controller with a great delay at Time t6 (610). In this case, however, at Time t4, a predetermined period for retransmission (a timeout period Td=t4−t3) expires. In response to this expiration, the radio network controller retransmits the data transmitted to the mobile terminal (not graphically illustrated). However, when the response period of the used communications channel is elongated, retransmission may be performed although, for instance, transmission and reception are normally performed. Therefore, in response to receiving no response from the mobile terminal within the predetermined period, the radio network controller transmits a time stamp request message at Time t5 (612). In response to this, the mobile terminal transmits a time stamp response message, which is received at Time t7.

The radio network controller calculates a response period in the response period calculation means 414 based on the difference between Time t5 of transmission of the time stamp request message and Time t7 of reception of the response message. An appropriate TFS and transmission band are determined based on the response period, so that the management table 422 is updated. The contents of the updated time table 422 are also reported to the mobile terminal. Then, at Time t8, communications are performed using the newly set TFS and transmission band, so that a response signal is returned within the predetermined period (timeout period) (616, 618). A description is given, with reference to FIG. 9, of the relationship between the TFS and the response period.

Figure 9:
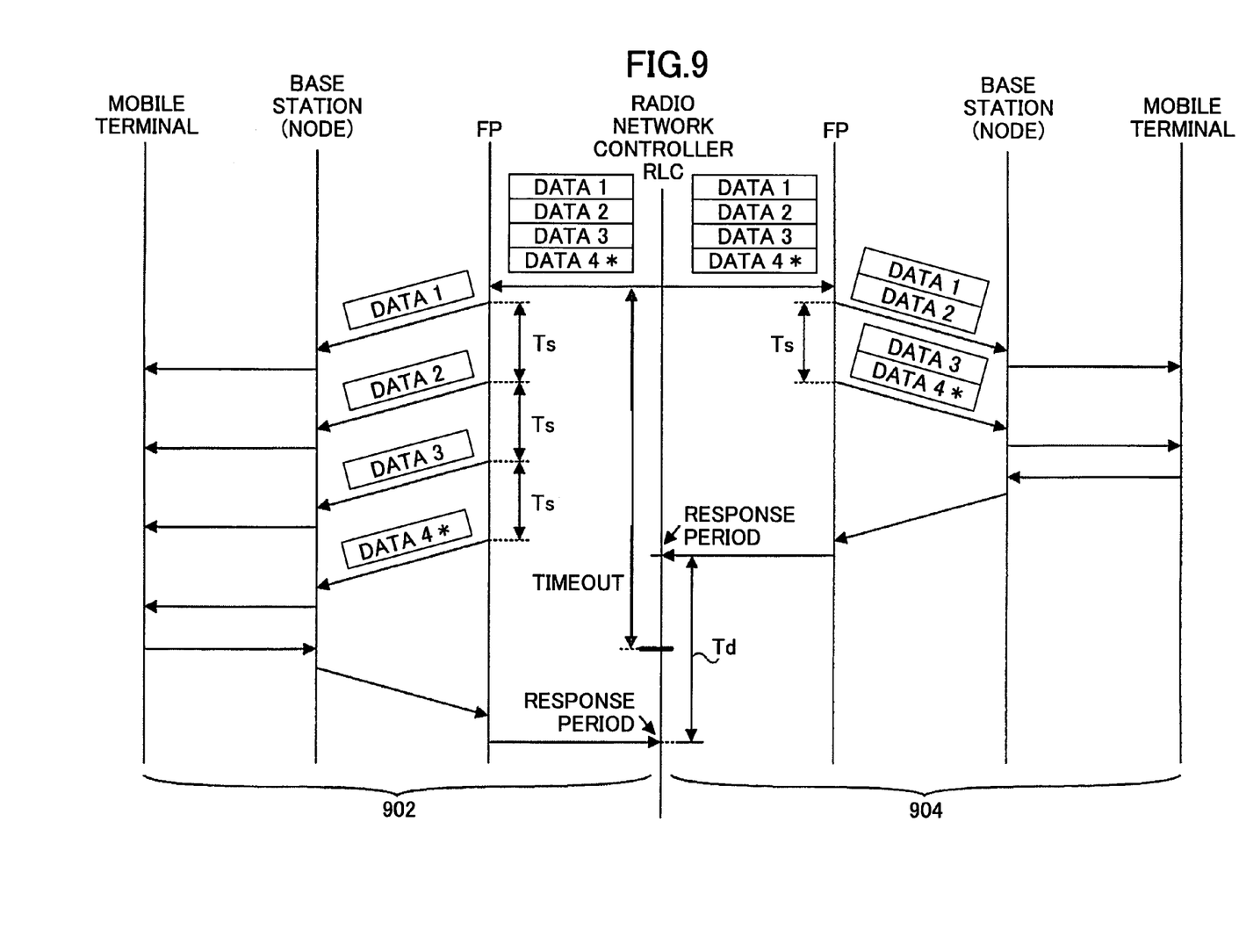
FIG. 9 is a timing chart for illustrating the relationship between a TFS and a response period.

FIG. 9 is a timing chart of signal processing related to each hierarchy or node. This timing chart generally relates to the transmission and reception of signals described in 608 and 610 of FIG. 6. First, as shown in a timing chart 902 on the left side in the drawing, the radio network controller, receiving data from a node such as a switch, divides the data into multiple (four in this case) data items of predetermined length such as 40 octets by the function in the RLC layer. The divided data items are transmitted to a base station (node) at regular intervals in accordance with the contents of a TFS by the frame protocol (FP) of the radio network controller. In this case, the amount of data determined by the TFS is, for instance, a single packet of 40 octets, and DATA 1 through DATA 4 are transmitted in order at regular time intervals Ts. DATA 4 is marked with an asterisk, which indicates that a polling bit is set. The mobile terminal returns an ACK or NACK response when receiving data in which a polling bit is set, but does not return such a response when receiving data in which a polling bit is not set. In general, such a polling bit is set in the last one of RLC-divided data items. Accordingly, the mobile terminal does not return a response when receiving DATA 1 through DATA 3, but returns a response when receiving DATA 4.

It is assumed in this case that an IP transmission line is included in the communications channel between the radio network controller and the base station so that the response period exceeds the timeout period. It is also assumed that the radio network controller measures a response period using the time stamp request message and the time stamp response message, and sets a new TFS. As shown in a timing chart 904 on the right side in the drawing, the radio network controller receives data from an upper level, and divides the data into, for instance, four data items by the function in the RLC layer. It is thus far the same as the previous case (902). The divided data items are transmitted by the amount of data determined by the TFS (two packets by two packets in this case) at the regular time intervals Ts by the frame protocol of the radio network controller. Since a polling bit is set in DATA 4, the mobile terminal returns an ACK or NACK response when receiving it. Unlike that described in the timing chart 902, transmission is performed from the FP two packets by two packets. Accordingly, the mobile terminal receives DATA 4 at an earlier time. As a result, the response period is reduced by Td so as to be within the timeout period. The change of the TFS contents is reported to each node between Time t6 and Time t7 (FIG. 6). Thus, by changing the TFS contents suitably, the response period can be controlled.

Figure 10:
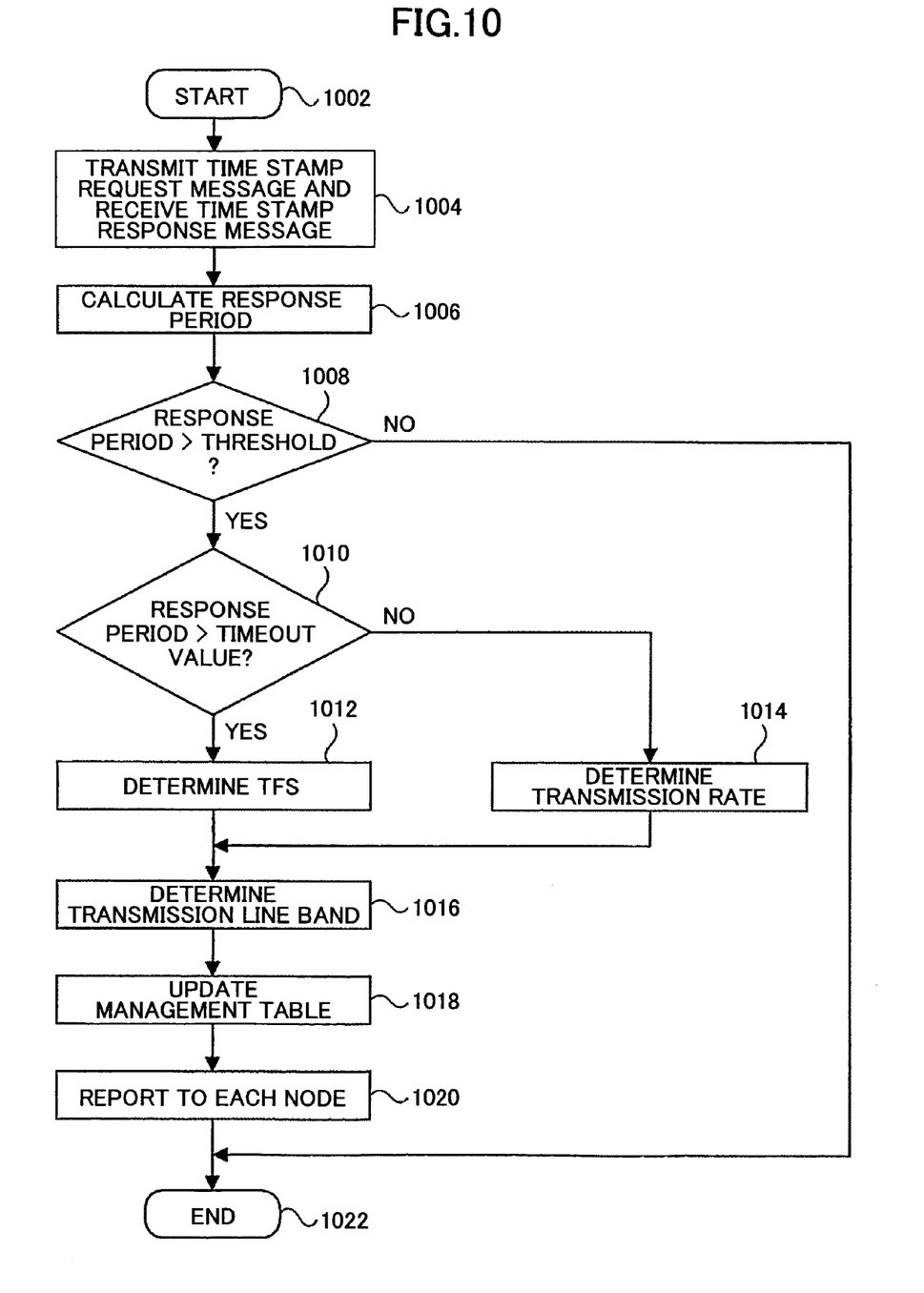
FIG. 10 is a flowchart for updating the TFS and a transmission line band according to the embodiment of the present invention.

FIG. 10 shows a flowchart for TFS and transmission line band updating performed mainly in the radio network controller. The flow starts at step 1002. In step 1004, a time stamp request message is transmitted to the mobile terminal via a base station, and a time stamp response message is received from the mobile terminal. In step 1006, a response period with respect to the communications channel is calculated using time information included in the received time stamp response message. In step 1008, it is determined whether the response period is greater than a threshold. This threshold is a value less than a predetermined period for retransmission (a timeout period). If the response period is less than this, the flow ends without changing values such as a TFS (1022). If the response period is too short, there is a risk of degradation of transmission efficiency due to a long period before retransmission. Therefore, it is also advantageous to change the TFS or transmission band if the response period is less than the predetermined threshold.

In step 1010, the length of the response period and the length of the timeout period are compared. If the response period is greater than the timeout period, step 1012 is entered. In this case, it is difficult to respond within the timeout period. Therefore, it is necessary to reduce the response period by changing the TFS. A change in the contents of the TFS may be determined by making a calculation on each occasion in the TFS determination means 418 or by referring to a table such as the management table 422. On the other hand, if the response period is not greater than the timeout period, step 1014 is entered where data transmission rate is determined.

Figure 11:
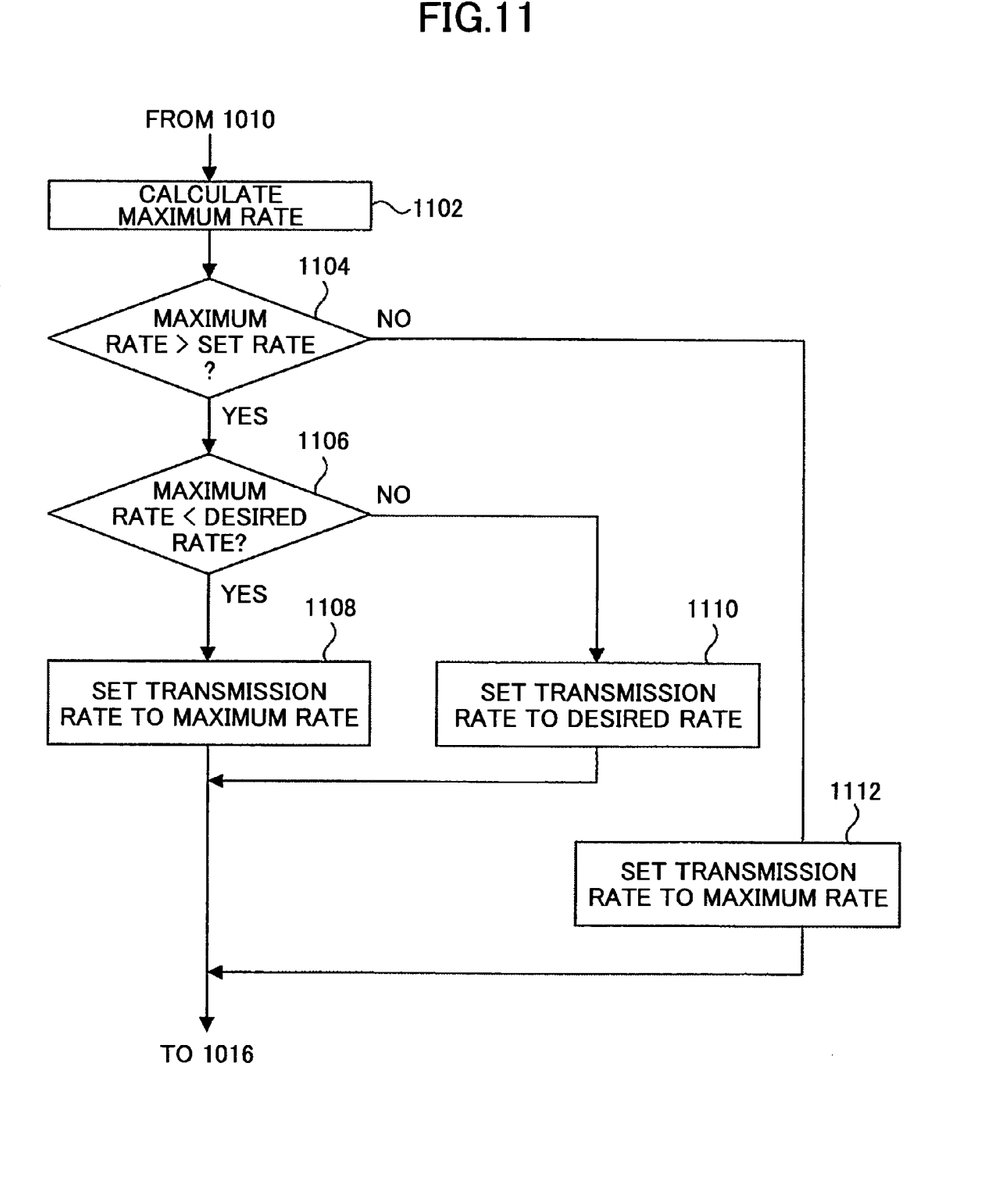
FIG. 11 is a flowchart for determining transmission rate.

FIG. 11 shows a flowchart for determining transmission rate (set rate) in step 1014 of FIG. 10. First, in step 1102, the maximum rate, which is a maximum rate possible for actual transmission, is calculated based on the transmission line band, the response period, etc., or read from a table. In step 1104, the maximum rate and the set rate (which is a currently set transmission rate and corresponds to what is to be entered in the third column from the left in FIG. 5) are compared. If the maximum rate is not greater than the set rate, some of actually set communications resources are wasted. Accordingly, in order to avoid it, the transmission rate (for the calculation of the transmission line band) is set to the maximum rate (step 1112). If the maximum rate is greater than the set rate, in step 1106, the maximum rate and a desired rate are compared. If the desired rate is greater than the maximum rate, it is impossible to transmit data at the desired rate. Accordingly, in step 1108, the transmission rate for the calculation of the transmission line band is set to the maximum rate. On the other hand, if the desired rate is not greater than the maximum rate, it is possible to perform the desired transmission. Accordingly, in step 1110, the transmission rate for the calculation of the transmission line band is set to the desired rate.

Referring back to FIG. 10, based on the transmission rate thus set and the TFS thus determined, in step 1016, an appropriate transmission line band is determined. This makes it possible to perform appropriate allocation of communications resources in conformity with the actual conditions of a communications environment in consideration of the response period. In step 1018, the contents of the management table 422, such as the TFS, the maximum rate, the set rate, etc., are updated to values to which they are changed. In step 1020, the updated contents are reported to each node, and the flow ends (1022).

By the way, in terms of taking into account the compatibility between the communications system according to the present invention and the conventional communications system, it is meaningful, for instance, to determine whether to control the changing of the TFS and the transmission band according to the present invention before calculating the response period in step 1006. For instance, if the mobile terminal is not supported by the communications system according to the present invention, the mobile terminal cannot interpret the time stamp request message properly, and returns a parameter abnormality message. It is possible to exclude a mobile terminal responding in such a manner from objects of control. Alternatively, it is also possible for the radio network controller to control the mobile terminal based on whether the mobile terminal desires to be controlled. For instance, an area to store a control flag may be prepared in the time stamp response message, and determination may be made based on the value of the control flag. Further, it is also possible to provide settings so that the control according to the present invention is performed at a predetermined time or regularly. It is also possible to measure a response period when the number of connections in the system is less than or equal to a predetermined number.

Thus, according to the embodiment of the present invention, a radio network controller in a system having an ATM transmission line and an IP transmission line divides transmission data into portions of a predetermined data size, transmits them to a base station, measures a signal response period in a communications channel used by a mobile terminal, and changes the predetermined data size based on the response period. Transmission efficiency may be improved by setting a data size suitable for the communications channel. In the communications system according to the embodiment of the present invention, the amount of data transmission (TFS) can be suitably controlled by a frame protocol (FP) located at a low hierarchy in the Radio Network Layer (RNL). Accordingly, there is no need to change the contents of control in the layers higher than the frame protocol (FP). That is, it is possible to improve transmission efficiency without changing a timeout period for retransmission managed in RLC, which is a higher layer.

According to the embodiment of the present invention, communications resources in a radio link are also managed based on a measured response period. This makes it possible to use communications resources reserved in a communications link efficiently without excess or deficiency.

According to the embodiment of the present invention, the radio network controller transmits a time stamp request signal, which is received by the mobile terminal, and the radio network controller receives a time stamp response signal from the mobile terminal. This makes it possible to measure a signal response period in the communications channel easily. When the timeout period is exceeded, the time stamp request signal is transmitted, the response period is measured, and a data transmission unit (TFS) is controlled. This makes it possible to make a quick response to a change in a communications environment. If the response period is measured regularly, the data transmission unit is controlled regularly. Accordingly, it is possible to reduce the probability of the occurrence of the expiration of the timeout period. It is also possible to do it when a prespecified time arrives. Further, a point in time at which the base station transmits a time adjustment signal to the radio network controller to perform time adjustment on the data transmission and reception between the base station and the radio network controller may be employed as a trigger for measuring a response period, updating a management table, etc. It is also possible to perform them when the number of mobile terminals communicating with the base station becomes less than a predetermined number.

The present invention is not limited to the specifically disclosed embodiment, and variations and modifications may be made without departing from the scope of the present invention.

What is claimed is:

1. A communications system, comprising:
    a base station configured to communicate with a mobile terminal through a radio link; and
    a radio network controller providing, at predetermined time intervals, the base station with original data to be transmitted to the mobile terminal by the base station,
    wherein the radio network controller includes:
    a division part configured to divide the original data into a plurality of data portions of a predetermined data size;
    a provision part configured to provide the base station with a predetermined number of the divided data portions at a time at the predetermined time intervals;
    a measuring part configured to determine a transmission time of a first signal transmitted by the radio network controller for measuring a signal response period in a communication channel between the radio network controller and the mobile terminal through the base station and a reception time of a second signal transmitted by the mobile terminal in response to the first signal and received by the radio network controller, and to measure the signal response period based on a difference between the determined transmission time and the determined reception time;
    a determination part configured to determine whether the measured signal response period is greater than a threshold and to determine whether the measured signal response period is greater than a predetermined period in response to determining that the measured signal response period is greater than the threshold; and
    a changing part configured to increase a number of the divided data portions provided by the provision part to the base station at a time within each of the predetermined time intervals from the predetermined number and change an amount of communication resources allocated to the communication with the mobile terminal based on the increased number of the divided data portions to be provided to the base station at a time within each of the predetermined time intervals, in response to the determination part determining that the signal response period measured by the measuring part being greater than the predetermined period.

2. A radio network controller, comprising:
a division part configured to divide original data to be transmitted to a mobile terminal by a base station through a radio link into a plurality of data portions of a predetermined data size;
a provision part configured to provide the base station with a predetermined number of the divided data portions at a time at predetermined time intervals;
a measuring part configured to determine a transmission time of a first signal transmitted by the radio network controller for measuring a signal response period in a communication channel between the radio network controller and the mobile terminal through the base station and a reception time of a second signal transmitted by the mobile terminal in response to the first signal and received by the radio network controller, and to measure the signal response period based on a difference between the determined transmission time and the determined reception time;
a determination part configured to determine whether the measured signal response period is greater than a threshold and to determine whether the measured signal response period is greater than a predetermined period in response to determining that the measured signal response period is greater than the threshold; and
a changing part configured to increase a number of the divided data portions provided by the provision part to the base station at a time within each of the predetermined time intervals from the predetermined number and change an amount of communication resources allocated to the communication with the mobile terminal based on the increased number of the divided data portions to be provided to the base station at a time within each of the predetermined time intervals, in response to the determination part determining that the signal response period measured by the measuring part being greater than the predetermined period.

3. A radio network controller, comprising:
a division part configured to divide original data to be transmitted to a mobile terminal by a base station through a radio link into a plurality of data portions of a predetermined data size;
a provision part configured to provide the base station with a predetermined number of the divided data portions at a time at predetermined time intervals;
a measuring part configured to measure a signal response period in a communication channel between the radio network controller and the mobile terminal through the base station, based on a time stamp response signal transmitted by the mobile terminal in response to a time stamp request signal transmitted from the radio network controller;
a determination part configured to determine whether the measured signal response period is greater than a threshold and to determine whether the measured signal response period is greater than a predetermined period in response to determining that the measured signal response period is greater than the threshold; and
a changing part configured to increase a number of the divided data portions provided by the provision part to the base station at a time within each of the predetermined time intervals from the predetermined number and change an amount of communication resources allocated to the communication with the mobile terminal based on the increased number of the divided data portions to be provided to the base station at a time within each of the predetermined time intervals, in response to the determination part determining that the signal response period measured by the measuring part being greater than the predetermined period.

4. The radio network controller as claimed in claim 2, wherein the measuring part is configured to measure the signal response period in response to not receiving a response signal, transmitted from the mobile terminal in response to predetermined data contained in one of the divided data portions, within a predetermined period.

5. The radio network controller as claimed in claim 2, wherein the measuring part is configured to measure the signal response period regularly.

6. The radio network controller as claimed in claim 2, wherein the measuring part is configured to measure the signal response period at a prespecified time.

7. The radio network controller as claimed in claim 2, wherein the base station communicates with the mobile terminal and one or more other mobile terminals, and,
the measuring part is configured to measure the signal response period with respect to each of the mobile terminal and the one or more other mobile terminals when a number of the mobile terminal and the one or more other mobile terminals communicating with the base station is less than a predetermined number.

8. The radio network controller as claimed in claim 2, wherein the measuring part is configured to measure the signal response period when a time adjustment signal is received from the base station.

9. The radio network controller as claimed in claim 2, wherein the measuring part is configured to be implemented in response to a request of the mobile terminal to establish the communication channel.

10. A radio network control method, comprising:
dividing original data to be transmitted to a mobile terminal by a base station through a radio link into a plurality of data portions of a predetermined data size;
providing the base station with a predetermined number of the divided data portions at a time at predetermined time intervals;
determining a transmission time of a first signal transmitted by the radio network controller for measuring a signal response period in a communication channel between the radio network controller and the mobile terminal through the base station and a reception time of a second signal transmitted by the mobile terminal in response to the first signal and received by the radio network controller, and measuring the signal response period based on a difference between the determined transmission time and the determined reception time;
determining whether the measured signal response period is greater than a threshold and determining whether the measured signal response period is greater than a predetermined period in response to determining that the measured signal response period is greater than the threshold; and
increasing a number of the divided data portions provided by said providing to the base station at a time within each of the predetermined time intervals from the predetermined number and changing an amount of communication resources allocated to the communication with the mobile terminal based on the increased number of the divided data portions to be provided to the base station at a time within each of the predetermined time intervals, in response to determining that the signal response period measured by said measuring being greater than the predetermined period.

* * * * *